March 12, 1968   R. C. BRADFORD   3,372,458
BEARING ALIGNING TOOL
Filed July 28, 1967

INVENTOR
Raymond C. Bradford

United States Patent Office

3,372,458
Patented Mar. 12, 1968

3,372,458
BEARING ALIGNING TOOL
Raymond C. Bradford, Rte. 1, Fayetteville,
Tenn. 37334
Filed July 28, 1967, Ser. No. 656,941
4 Claims. (Cl. 29—271)

ABSTRACT OF THE DISCLOSURE

A tool adapted for heavy equipment vehicles wherein a wheel dolly is used to pull a wheel off. The tool includes principally a steel tube, a coil spring, a snap and aligning cone.

---

This invention relates generally to wheel pulling equipment.

A principal object of the present invention is to provide a tool that is designed especially for heavy equipment and wherein a wheel dolly is used to pull off a wheel, for example, such as of a semi-trailer having dual wheels. In order to install an oil seal, it is necessary to let the dolly down, tilt the wheel 45 degrees, thus preventing the bearing from sliding out while the seal is being driven in so as to prevent damaging the seal by hitting or striking the bearing.

Another object of the present invention is to provide a bearing aligning tool which besides saving the seal will also save time in installation.

Yet another object of the present invention is to provide a bearing aligning tool wherein there is a cone member which is designed for a bearing that fits most semi-trailers.

Still another object of the present invention is to provide a bearing aligning tool wherein the cone member may be interchangeable with other size cones so as to fit all trailers and tractors.

Other objects of the present invention are to provide a bearing aligning tool which is simple in design, inexpensive to manufacture, rugged in construction, easy to use and efficient in operation.

These and other objects will be readily evident upon a study of the following specification and the accompanying drawing wherein.

Figures 1, 2, 3:
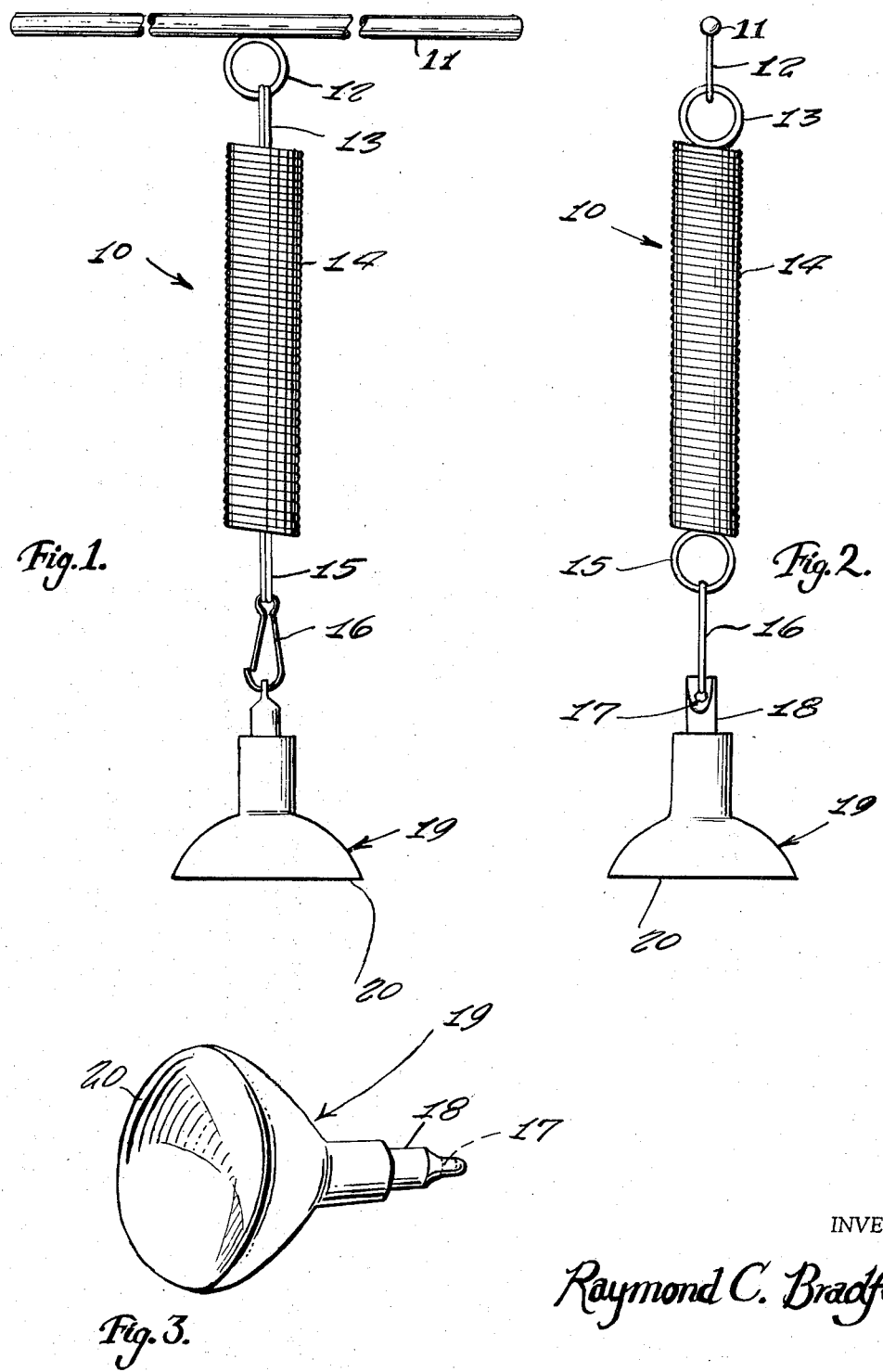
FIGURE 1 is a front elevation view of the present invention.
FIGURE 2 is a side elevation view thereof.
FIGURE 3 is a perspective view of an aligning cone.

Referring now to the drawing in detail, the reference numeral 10 represents a bearing aligning tool, according to the present invention, wherein there is a steel tube 11 which may be of approximately 21″ in length and approximately 5/16 of an inch in diameter. A ring 12 is centrally attached along an intermediate longitudinally positioned place alongside steel tube, the ring providing attachment means for one end 13 of a tension coil spring 14. The opposite end 15 of the tension coil spring 14 is attached to a snap hook 16 which is additionally attached through an opening 17 in the stem 18 of an aligning cone 19. The aligning cone 19 is of vacuum cup configuration and having a lower edge 20 of circular configuration which is adaptable for placement respective to the bearing.

In operative use, all that is necessary is to run the steel tube 11 through the bearing, through the hub and place the steel tube handle across the wheel upon the other side. The spring tension will hold the bearing in place while driving the seal into place. The wheel is then ready to go back upon the spindle without requiring any adjustments.

It is to be noted that the cone 19 is designed for a particular bearing which will fit most semi-trailers. However, extra cones of different sizes may be interchangeably secured to the snap hook of the present device and will thus accommodate all tractors and trailers.

While various changes may be made in the detailed construction it is understood that such changes will be within the spirit and scope of the present invention as is defined by the appended claims.

I claim:

1. In a bearing aligning tool, the combination of a handle comprises a steel tube, said steel tube being of said handle, a snap hook, said snap hook being carried by said coil spring and said snap hook being removably connected to an aligning cone.

2. The combination according to claim 1 wherein said handle comprises a steel tube, said steel tube being of approximately 21″ in length, said steel tube having a ring affixed at a longitudinal center thereof to provide securement means for one end of said coil spring.

3. The combination as set forth in claim 2 wherein said coil spring comprises a tension coil spring, said tension coil spring being secured at its other end to said snap hook.

4. The combination as set forth in claim 3 wherein said aligning cone comprises a vacuum cup configurated member having a stem with an opening therein, said opening receiving said snap hook, and said aligning cone being made in different sizes so as to accommodate all tractors and trailers.

References Cited

UNITED STATES PATENTS

| | | | |
|---|---|---|---|
| 1,354,624 | 10/1920 | Schow | 152—218 |
| 2,121,937 | 6/1938 | Tichota et al. | 29—271 X |
| 2,127,181 | 8/1938 | Mattern | 29—278 X |
| 2,495,040 | 1/1950 | Walden | 29—270 X |
| 3,171,193 | 3/1965 | Bowden | 29—278 |

FOREIGN PATENTS 485,518   5/1938   Great Britain.

MYRON C. KRUSE, *Primary Examiner.*